(12) United States Patent
Yano (10) Patent No.: US 10,655,028 B2
(45) Date of Patent: May 19, 2020

(54) INK JET RECORDING METHOD AND INK SET

(71) Applicant: Seiko Epson Corporation, Tokyo (JP)

(72) Inventor: Takeshi Yano, Shiojiri (JP)

(73) Assignee: Seiko Epson Corporation (JP)

( * ) Notice: Subject to any disclaimer, the term of this patent is extended or adjusted under 35 U.S.C. 154(b) by 127 days.

(21) Appl. No.: 15/098,649

(22) Filed: Apr. 14, 2016

(65) Prior Publication Data

US 2016/0312053 A1 Oct. 27, 2016

(30) Foreign Application Priority Data

Apr. 21, 2015 (JP) .................. 2015-086997

(51) Int. Cl.
| | | |
|---|---|---|
| *C09D 11/38* | (2014.01) | |
| *C09D 11/322* | (2014.01) | |
| *C09D 11/10* | (2014.01) | |
| *C09D 11/54* | (2014.01) | |
| *B41J 2/21* | (2006.01) | |

(52) U.S. Cl.
CPC .............. *C09D 11/38* (2013.01); *C09D 11/10* (2013.01); *C09D 11/322* (2013.01); *C09D 11/54* (2013.01); *B41J 2/2114* (2013.01)

(58) Field of Classification Search
CPC ......... C09D 11/54; C09D 11/38; C09D 11/10; B41J 2/2114; B41M 5/0011; B41M 5/0017; B41M 5/0064; B41M 5/0058
See application file for complete search history.

(56) References Cited

U.S. PATENT DOCUMENTS

| | | | | |
|---|---|---|---|---|
| 6,328,438 B1* | 12/2001 | Ozawa | ................... | B41J 2/2114 347/95 |
| 6,426,375 B1* | 7/2002 | Kubota | ................... | B41J 2/2114 347/106 |
| 6,841,205 B1* | 1/2005 | Sismondi | ................. | B41M 5/52 428/32.24 |
| 7,332,532 B2* | 2/2008 | Vasudevan | ........... | C09D 11/326 523/160 |
| 8,454,150 B2 | 6/2013 | Komatsu | | |
| 8,757,784 B2 | 6/2014 | Aoyama et al. | | |
| 9,114,653 B2 | 8/2015 | Aoyama et al. | | |
| 9,187,657 B2 | 11/2015 | Yano et al. | | |

(Continued)

FOREIGN PATENT DOCUMENTS

| | | |
|---|---|---|
| EP | 2850931 A1 | 3/2015 |
| JP | 2010-105228 A | 5/2010 |

(Continued)

*Primary Examiner* — John Zimmermann
(74) *Attorney, Agent, or Firm* — Harness, Dickey & Pierce, P.L.C.

(57) ABSTRACT

An ink jet recording method includes a reaction liquid attaching process of attaching a reaction liquid containing a coagulant having solubility of 120 g or less in 100 g of water as a coagulant which coagulates components of an ink composition to a low absorbent recording medium or a non-absorbent recording medium to form a first recorded region, and an ink composition attaching process of attaching the ink composition containing water and a resin having a percentage of water absorption of 0.3% or less to at least one part of the first recorded region to form a second recorded region.

11 Claims, 2 Drawing Sheets

(56) References Cited

U.S. PATENT DOCUMENTS

| | | | |
|---|---|---|---|
| 2005/0176872 A1* | 8/2005 | Martin | C09J 5/02 |
| | | | 524/515 |
| 2009/0233061 A1* | 9/2009 | Irita | B41J 11/0015 |
| | | | 428/195.1 |
| 2010/0062200 A1* | 3/2010 | Domes | B05D 7/14 |
| | | | 428/35.8 |
| 2010/0104758 A1 | 4/2010 | Komatsu | |
| 2010/0143730 A1* | 6/2010 | Tai | C08L 33/20 |
| | | | 428/458 |
| 2011/0227994 A1 | 9/2011 | Yanagi | |
| 2012/0128949 A1 | 5/2012 | Goto | |
| 2013/0021398 A1* | 1/2013 | Mizes | B41J 2/2114 |
| | | | 347/14 |
| 2013/0182057 A1 | 7/2013 | Koase | |
| 2013/0201252 A1 | 8/2013 | Namba | |
| 2014/0192112 A1 | 7/2014 | Nagashima et al. | |
| 2014/0192121 A1 | 7/2014 | Bannai et al. | |
| 2015/0328904 A1 | 11/2015 | Yano | |
| 2018/0030298 A1 | 2/2018 | Yamazaki et al. | |

FOREIGN PATENT DOCUMENTS

| | | |
|---|---|---|
| JP | 2010-115854 A | 5/2010 |
| JP | 2011-063016 A | 3/2011 |
| JP | 2011-194613 A | 10/2011 |
| JP | 2013-064082 A | 4/2013 |
| JP | 2013-144385 A | 7/2013 |
| JP | 2013-176972 A | 9/2013 |
| JP | 2014-131855 A | 7/2014 |
| JP | 2014-148159 A | 8/2014 |
| JP | 2015-057983 A | 3/2015 |
| JP | 5862913 B1 | 2/2016 |

\* cited by examiner

INK JET RECORDING METHOD AND INK SET

BACKGROUND

1. Technical Field

The present invention relates to an ink jet recording method and an ink set.

2. Related Art

According to the ink jet recording method, a high definition image can be recorded with a relatively simple apparatus, and the ink jet recording method has been rapidly developed in various fields. In the development, various studies on the abrasion resistance and the like of recorded matter to be obtained have been made. For example, for the purpose of providing a printing method using an ink jet recording system which allows high-speed printing on non-ink-absorbing and low-ink-absorbing recording media, gives good abrasion resistance, and is difficult to cause clogging of an ink jet head, JP-A-2010-105228 discloses a printing method using an ink jet recording system of forming an image on non-ink-absorbing and low-ink-absorbing recording media by an ink jet recording system using an aqueous ink set, in which (1) the aqueous ink set has a color ink containing a colorant and a resin ink not containing a colorant, (2) the color ink contains the colorant which is insoluble in water, a resin component, a water-soluble solvent, and a surfactant, (3) the resin ink contains a water-soluble resin solvent, thermoplastic resin particles which are insoluble in water but are compatible with the water-soluble resin solvent as the resin component, and a wax, the content of the thermoplastic resin particles is 4% by mass or more and 12% by mass or less in the resin ink, and the content of the wax is 0.5% by mass or more and 6% by mass or less in the resin ink, (4) a printing process includes a process of performing recording with the color ink and a process of performing recording with the resin ink after the process of performing recording with the color ink, and (5) the printing process includes a drying process during the printing and/or after the printing.

However, a reaction liquid containing a coagulant which coagulates components of an ink composition is not used in the recording method described in JP-A-2010-105228, which poses a problem that the image quality of recorded matter to be obtained deteriorates. Moreover, when recording is performed on a low absorbent recording medium or a non-absorbent recording medium using a reaction liquid, there is a problem that the wet abrasion resistance of recorded matter to be obtained deteriorates.

SUMMARY

An advantage of some aspects of the invention to provide an ink jet recording method and an ink set which can provide recorded matter having excellent wet abrasion resistance and a high definition in the case of using a low absorbent recording medium or a non-absorbent recording medium.

The present inventors have conducted an extensive research in order to solve the above-described problems. As a result, the present inventors have fund that the above-described problems can be solved by a recording method using a predetermined reaction liquid and a predetermined ink composition, and then have accomplished the invention based on the finding.

More specifically, the invention is as follows.

[1] An ink jet recording method includes a reaction liquid attaching process of attaching a reaction liquid containing a coagulant having solubility of 120 g or less in 100 g of water as a coagulant which coagulates components of an ink composition to a low absorbent recording medium or a non-absorbent recording medium to form a first recorded region, and an ink composition attaching process of attaching the ink composition containing water and a resin having a percentage of water absorption of 0.3% or less to at least one part of the first recorded region to form a second recorded region.

[2] The ink jet recording method according to [1] above, in which the resin contains resin fine particles.

[3] The ink jet recording method according to [1] or [2] above, in which the maximum application amount of the resin in the second recorded region is 0.050 to 0.45 mg/inch$^2$.

[4] The ink jet recording method according to any one of [1] to [3] above, in which a color ink composition containing water, a coloring material, and the resin having a percentage of water absorption of 0.3% or less, and a clear ink composition containing water and the resin having a percentage of water absorption of 0.3% or less are used as the ink composition.

[5] The ink jet recording method according to any one of [1] to [4] above, in which the ink composition attaching process includes a process of attaching a first ink composition which contains water and the resin having a percentage of water absorption of 0.3% or less and in which the content of the resin having a percentage of water absorption of 0.3% or less is less than 0.50% by mass to at least one part of the first recorded region to form a second second recorded region, and a process of attaching a second ink composition which contains water and the resin having a percentage of water absorption of 0.3% or less and in which the content of the resin having a percentage of water absorption of 0.3% or less is 0.50% by mass or more to at least one part of the second second recorded region to form a second recorded region.

[6] The ink jet recording method according to any one of [1] to [3] above, in which a clear ink composition containing water and the resin having a percentage of water absorption of 0.3% or less is used as the ink composition.

[7] The ink jet recording method according to any one of [1] to [6] above, in which the maximum application amount of the coagulant in the first recorded region is 0.0030 to 0.15 mg/inch$^2$.

[8] The ink jet recording method according to any one of [1] to [6] above, in which the low absorbent recording medium or the non-absorbent recording medium is a film.

[9] The ink jet recording method according to [1] to [8] above, in which the reaction liquid contains at least either a polyvalent metallic salt or organic acid as the coagulant.

[10] An ink set at least contains an ink composition containing water and a resin having a percentage of water absorption 0.3% or less, and a reaction liquid containing a coagulant having solubility of 120 g or less in 100 g of water as a coagulant which coagulates components of the ink composition, and the ink set is used for performing recording on a low absorbent recording medium or a non-absorbent recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention (hereinafter referred to as "this embodiment") is described in detail with reference to the drawings as necessary but the invention is not limited thereto and can be variously modified without deviating from the scope. In the drawings, the same components are designated by the same reference numerals and the duplicated description is omitted. The positional relationship, such as left, right, top and bottom, is based on the positional relationship illustrated in the drawings unless otherwise particularly specified. Furthermore, the dimension ratio of the drawings is not limited to the ratio in the drawings.

Ink Jet Recording Method

An ink jet recording method of this embodiment includes a reaction liquid attaching process of attaching a reaction liquid containing a coagulant having solubility of 120 g or less in 100 g of water as a coagulant which coagulates components of an ink composition to a low absorbent recording medium or a non-absorbent recording medium to form a first recorded region and an ink composition attaching process of attaching the ink composition containing water and a resin having a percentage of water absorption of 0.3% or less to at least one part of the first recorded region to form a second recorded region.

Thus, in recorded matter to be obtained by the use of a predetermined resin and a predetermined coagulant, the coagulant having relatively high hygroscopicity is covered with a resin film having high water repellency. Therefore, even when a low absorbent recording medium or a non-absorbent recording medium is used, recorded matter having excellent wet abrasion resistance and high definition can be obtained.

Figure 1:
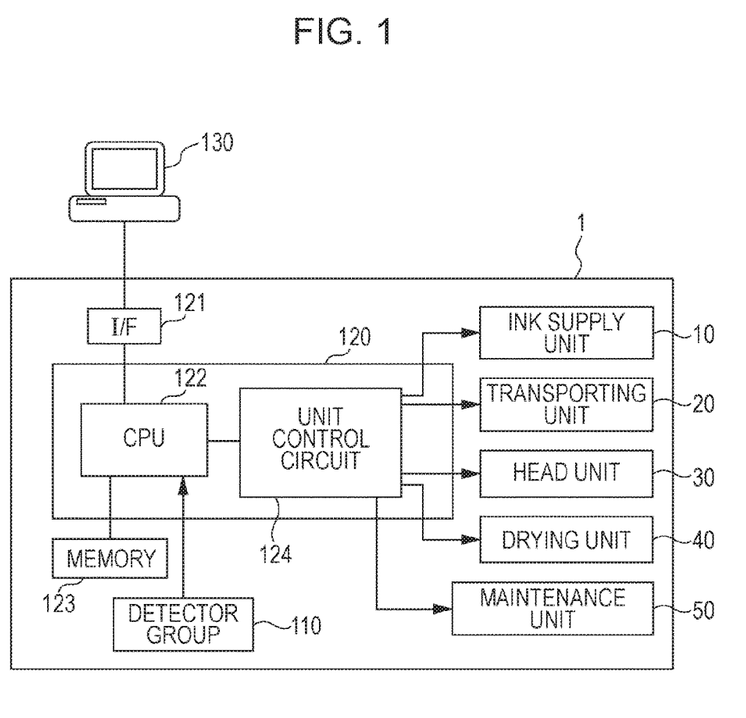
FIG. 1 is a block diagram illustrating an example of the configuration of a recording apparatus usable in this embodiment.

FIG. 1 illustrates a block diagram illustrating an example of the configuration of a recording apparatus usable in this embodiment. In a computer 130, a printer driver is installed. In order to cause an ink jet recording apparatus 1 to record an image, the computer 130 outputs print data according to the image to the ink jet recording apparatus 1. The ink jet recording apparatus 1 has an ink supply unit 10, a transporting unit 20, a head unit 30, a drying unit 40, a maintenance unit 50, a detector group 110, a memory 123, an interface 121, and a controller 120.

The controller 120 has a CPU 122 and a unit control circuit 124. The ink jet recording apparatus 1 which receives print data from the computer 130 which is an external apparatus controls each unit by the controller 120 to control various recording conditions, and then records an image on a recording medium according to the print data.

The state in the ink jet recording apparatus 1 is monitored by the detector group 110. The detector group 110 outputs the detection results to the controller 120. The controller 120 controls each unit based on the detection results output from the detector group 110, and then stores the print data input through the interface 121 in the memory 123. The memory 123 also stores control information for controlling each unit.

The drying unit 400 has a heater, an air blowing unit, and the like, and dries a composition, such as ink, adhering to a recording medium.

Figure 2:
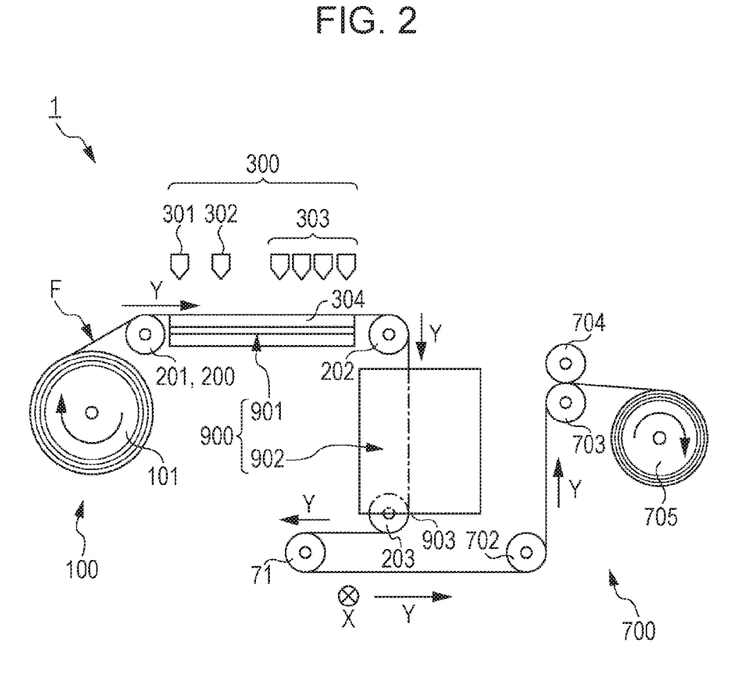
FIG. 2 is a side view illustrating the entire outline of an example of an ink jet recording apparatus usable in this embodiment.

Next, FIG. 2 illustrates the side view illustrating the entire outline of an example of the ink jet recording apparatus 1 usable in this embodiment. As illustrated in FIG. 2, the ink jet recording apparatus 1 has a recording medium feeding section 100, a transporting section 200, a recording section 300, a discharging section 700, and a drying section 900. Among the above, the drying section 900 has a first drying section 901 which dries a reaction liquid and a second drying section 902 which dries recorded matter obtained by the recording method according to this embodiment.

The feeding section 100 is provided in such a manner as to be able to feed a roll-like recording medium F to the transporting section 200. Specifically, the feeding section 100 has a roll medium holder 101, in which the roll medium holder 101 holds the roll-like recording medium F. The feeding section 100 is configured so that, by causing the roll-like recording medium F to rotate, the recording medium F can be fed to the transporting section 200 on the downstream side in a feeding direction Y.

Furthermore, the transporting section 200 is provided in such a manner as to be able to transport the recording medium F fed from the feeding section 100 to the recording section 300. Specifically, the transporting section 200 has a first feeding roller 201 and is configured in such a manner as to be able to transport the fed recording medium F to the recording section 300 on the further downstream side in the feeding direction Y.

The recording section 300 is provided in such a manner as to be able to apply a reaction liquid to the recording medium F fed from the transporting section 200, and then discharge an ink composition to the recording medium for recording. Specifically, the recording section 300 has heads 301 and 302 which perform the reaction liquid attaching process, a recording head 303 which performs the ink composition attaching process, and a platen 304 as a medium supporting section.

The heads 301, 302, and 303 each have a cavity which discharges the received reaction liquid or ink composition from a nozzle, a discharge driving section which is provided in each cavity and gives a discharge driving force to the reaction liquid or the ink composition, a nozzle which is provided in each cavity and discharges the reaction liquid or the ink composition to the outside of the heads, and a nozzle formation surface where the nozzle is formed. Two or more of the cavities and two or more of the discharge driving sections and the nozzles provided in each cavity may be independently provided in one head. The discharge driving section can be formed using an electromechanical conversion element, such as a piezoelectric element, which varies the capacity of the cavity by mechanical deformation, an electronic heat conversion element which generates air bubbles in ink by generating heat to discharge the ink, and the like. The ink jet recording apparatus 1 may be provided with one or two or more heads per ink of one color. When two or more heads are provided, a line head may be configured by arranging the two or more heads in the width direction of the recording medium. In this case, a record width can be lengthened. When recording is performed using ink compositions of a plurality of colors, the recording apparatus has a head for each ink. The head can be configured as in FIG. 3, for example, of JP-A-2009-279830, for example.

When the ink jet recording apparatus 1 is a line printer which is a line-type recording apparatus, a line head having a length equal to or larger than the length equivalent to the width of a recording medium is provided as the head. In this case, the ink composition is discharged from the line head towards the recording medium while the line head and the recording medium are relatively changing the positions in the scanning direction crossing the width direction. In the line printer, recording is performed in one path (single path) while the heads are being fixed without (almost) not moved. The line printer is more advantageous than a serial printer in the respect that the recording speed is high.

Herein, in the "ink jet head having the nozzle array width of the length equal to or larger than the record width of the recording medium", the width of the recording medium and the length (width) of the line head may be different from each other without being limited to the case where the widths are completely in agreement with each other. As such a case, a case is mentioned where the length (width) of the line head is equivalent to the width (target record width) of the recording medium to which the reaction liquid or the ink composition is to be discharged (on which an image is to be recorded), for example.

On the other hand, a serial printer which is a serial-type recording apparatus performs main scanning (path) of discharging an ink composition while the head is moving in the main scanning direction crossing the subscanning direction of a recording medium and usually performs recording in 2 or more (multipath) paths.

The platen 304 is provided in such a manner as to be able to support the recording medium F from the back surface. The platen 304 is provided with the first drying section 901 which dries the reaction liquid adhering to the recording medium F and the ink composition adhering to the recording medium F. Furthermore, a second feeding roller 202 is provided on the downstream side in the feeding direction Y relative to the platen 304. The second feeding roller 202 is configured in such a manner as to be able to feed the recorded recording medium F to the second drying section 902 on the downstream side in the feeding direction Y.

The second drying section 902 is configured in such a manner as to be able to further dry the reaction liquid adhering to the recording medium F and the ink composition adhering to the recording medium F. Furthermore, a third feeding roller 203 is provided in the vicinity of an outlet 903 of the second drying section 902. The third feeding roller 203 is disposed in such a manner as to contact the back surface of the recording medium F and is configured in such a manner as to be able to feed the recording medium F to the discharging section 700 on the downstream side in the feeding direction Y.

The discharging section 700 is provided in such a manner as to be able to further feed the recording medium F fed from the second drying section 902 to the downstream side in the feeding direction Y to discharge the recording medium F to the outside of the ink jet recording apparatus 1. Specifically, the discharging section 700 has a fourth feeding roller 701, a fifth feeding roller 702, a sixth feeding roller 703, a seventh feeding roller 704, and a winding roller 705. Among the above, the fourth feeding roller 701 and the fifth feeding roller 702 are disposed in such a manner as to contact the front surface of the recording medium F. The sixth feeding roller 703 and the seventh feeding roller 704 are disposed in such a manner as to form a roller pair. The sixth feeding roller 703 and the seventh feeding roller 704 are provided in such a manner that the recording medium F discharged by the sixth feeding roller 703 and the seventh feeding roller 704 is wound up by the winding roller 705.

Reaction Liquid Attaching Process

The reaction liquid attaching process is a process of attaching a reaction liquid containing at least any one of coagulants having solubility of 120 g or less in 100 g of water as a coagulant which coagulates components of an ink composition to a low absorbent recording medium or a non-absorbent recording medium to form a first recorded region.

A method for attaching the reaction liquid is not particularly limited and, for example, roller coating, spray coating, and ink jet coating can be utilized. The reaction liquid attaching process may further include a process of drying at least one part of the reaction liquid applied to the recording medium.

The maximum application amount of the coagulant in the first recorded region is preferably 0.00050 to 0.25 mg/inch$^2$, more preferably 0.0010 to 0.20 mg/inch$^2$, and still more preferably 0.0030 to 0.15 mg/inch$^2$. Due to the fact that the maximum application amount of the coagulant is 0.00050 mg/inch$^2$ or more, the image quality of recorded matter to be obtained tends to be further improved. Due to the fact that the maximum application amount of the coagulant is 0.25 mg/inch$^2$ or less, the wet abrasion resistance of recorded matter to be obtained tends to be further improved.

Reaction Liquid

The reaction liquid contains a coagulant having solubility of 120 g or less in 100 g of water as a coagulant which coagulates components of an ink composition and can contain water and other components, such as an organic solvent, as necessary. Examples of the coagulant include polyvalent metallic salts, organic acids, and other cationic compounds. Among the above, the reaction liquid preferably contains at least either polyvalent metallic salts or organic acids and more preferably contains polyvalent metallic salts. Due to the fact that polyvalent metallic salts are contained, the image quality of recorded matter to be obtained tends to be further improved. Due to the fact that the coagulant in the reaction liquid interacts with the ink composition, components contained in the ink composition are coagulated to thicken or insolubilize the ink composition. Thus, landing interference and blurring of the ink composition to be attached afterward can be prevented, so that a line, a detailed image, and the like can be homogeneously drawn. Examples of the components contained in the ink composition coagulated by the coagulant include pigments and resin mentioned later.

The solubility in 100 g of water of the coagulant is 120 g or less, preferably 100 g or less, more preferably 80 g or less, and still more preferably 50 g or less. Due to the fact that the solubility in 100 g of water of the coagulant is 120 g or less, the wet abrasion resistance of recorded matter to be obtained is further improved. The lower limit of the solubility in 100 g of water of the coagulant is not particularly limited and is preferably 2 g or more and more preferably 10 g or more. Due to the fact that the solubility in 100 g of water of the coagulant is 2 g or more, the image quality of recorded matter to be obtained tends to be further improved. When the solubility of the coagulant is low, the addition amount of the coagulant to the reaction liquid is limited. Therefore, the aggregation effects become consequently insufficient, so that the image quality of recorded matter tends to deteriorate. The solubility in 100 g of water of the coagulant is a value at 20° C. The solubility is confirmed by adding a predetermined amount of the coagulant to water at 20° C., stirring the mixture for 1 minute, and then stopping the stirring. Then, it is visually confirmed whether or not the mixed liquid has cloudiness or a residual solid content, and then the amount at which the mixed liquid is free from cloudiness or a residual solid content is defined as the maximum addition amount of the coagulant.

With respect to the percentage of water absorption of resin, liquid containing the resin is added dropwise to a glass plate, dried, and then heated for 10 minutes at a temperature of +10° C. of the glass transition point temperature of the resin after drying to form a dry resin layer. However, when the glass transition point temperature of the resin is less than 40° C. in this process, the liquid is heated at 50° C. for 10 minutes. Next, the mass of the resin of the resin layer is measured. Then, the glass plate on which the resin layer is formed is placed in a high temperature and high humidity chamber, and then allowed to stand under an atmosphere of a humidity of 100% RH and a temperature of 50° C. for 3 days. Next, the glass plate is taken out from the high temperature and high humidity chamber, the mass of the resin layer is measured in a state where water droplets do not adhere to the surface of the glass plate or the resin layer, and then the percentage of water absorption is calculated from a mass (M2) of the resin layer after taken out from the high temperature and high humidity chamber based on a mass (M1) of the resin layer before placed in the high temperature and high humidity chamber.

Percentage of water absorption=$(M2-M1)/M1 \times 100$ (%)

Polyvalent Metallic Salt

The polyvalent metallic salts are not particularly limited and are preferably polyvalent metallic salts of inorganic acids or polyvalent metallic salts of organic acids, for example. Such polyvalent metallic salts are not particularly limited, and include, for example, salts of the alkaline-earth metals of Group II of the periodic table (for example, magnesium and calcium), the transition metals of Group III of the periodic table (for example, lantern), the ground metals of Group XIII of the periodic table (for example, aluminum), and lanthanides (for example, neodymium). The salts of the polyvalent metals are preferably carboxylic acid salts (formic acid, acetic acid, benzoic acid salt, and the like), sulfuric acid salts, nitric acid salts, hydrochloric acid salts, and thiocyanic acid salts. Among the above, calcium salts or magnesium salts of carboxylic acids (formic acid, acetic acid, benzoic acid salts, and the like), calcium salts or magnesium salts of sulfuric acids, calcium salts or magnesium salts of nitric acids, and calcium salts or magnesium salts of calcium chloride, magnesium chloride, and thiocyanic acid are preferably mentioned.

More specifically, mentioned are magnesium salts, such as magnesium chloride, magnesium bromide, magnesium acetate, magnesium nitrate, magnesium sulfate, magnesium thiosulfate, magnesium perchlorate, magnesium selenate, magnesium hexafluorosilicate, magnesium formate, magnesium iodate, and magnesium molybdate; calcium salts, such as calcium formate, calcium hydrogencarbonate, calcium selenate, calcium acetate dihydrate, calcium cyanide, calcium nitrite tetrahydrate, calcium chloride, calcium iodide, calcium benzoate, calcium chromate, and calcium dihydrogenphosphate; and aluminum salts, such as aluminum nitrate, aluminum chloride, aluminum sulfate, and aluminum sulfate ammonium. The polyvalent metallic salts may be used alone or in combination of two or more kinds thereof.

Organic Acid

The organic acids are not particularly limited and include, for example, oxalic acid, benzoic acid, malic acid, and succinic acid. Among the above, succinic acid is preferable. Due to the fact that such carboxylic acids are contained, the image quality of recorded matter to be obtained tends to be further improved. The organic acids may be used alone or in combination of two or more kinds thereof.

Other Cationic Compounds

Other cationic compounds are not particularly limited and include cationic resin, cationic surfactants, and the like.

Examples of the cationic resin include cationic urethane-based resin, cationic olefin-based resin, cationic amine-based resin, and the like, for example.

As the cationic urethane-based resin, known substances can be selected and used as appropriate. Commercially-available items can be used as the cationic urethane-based resin and, for example, HYDRAN CP-7010, CP-7020, and CP-7030, CP-7040, CP-7050, CP-7060, and CP-7610 (Trade name, manufactured by Dainippon Ink and Chemicals, Incorporated), SUPERFLEX 600, 610, 620, 630, 640, and 650 (Trade name, manufactured by Daiichi Kogyo Seiyaku Co., Ltd.), Urethane emulsion WBR-2120C and WBR-2122C (Trade name, manufactured by TAISEI FINE CHEMICAL CO., LTD.), and the like can be used.

The cationic olefin-based resin has olefin, such as ethylene and propylene, in the structure skeleton, and known substances can be selected and used as appropriate. The cationic olefin-based resin may be in an emulsion state in which the cationic olefin-based resin is dispersed in a solvent containing water, an organic solvent, and the like. As the cationic olefin-based resin, commercially-available items can be used and, for example, ARROW BASE CB-1200 and CD-1200 (Trade name, manufactured by UNITIKA LTD.) are mentioned.

As the cationic amine-based resin, known substances can be selected and used as appropriate and, for example, polyallylamine hydrochloride, polyallylamine amidsulfate, an allylamine hydrochloride.diallylamine hydrochloride copolymer, an allylamine acetate.diallylamine acetate copolymer, an allylamine acetate.diallylamine acetate copolymer, an allylamine hydrochloride.dimethyldiallylamine hydrochloride copolymer, an allylamine.dimethyldiallylamine copolymer, polydiallylamine hydrochloride, polymethyldiallylamine hydrochloride, polymethyldiallylamine amidosulfate, polymethyldiallylamine acetate, polydiallyl dimethyl ammonium chloride, a diallylamine acetate.sulfur dioxide copolymer, a diallyl methylethyl ammonium ethyl sulfate-sulfur dioxide copolymer, a methyldiallylamine hydrochloride.sulfur dioxide copolymer, a diallyl dimethyl ammonium chloride.sulfur dioxide copolymer, and a diallyl dimethyl ammonium chloride.acrylamide copolymer can be mentioned. As such a cationic allylamine-based resin, commercially available items can be used, and for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, PAS-J-81 (Trade name, manufactured by NITTOBO MEDICAL CO., LTD.), HYMONEO-600, HYMOLOC Q-101, Q-311, and Q-501, and HIMAX SC-505 and SC-505 (trade name, manufactured by HYMO Co., Ltd.), and the like can be used.

Examples of the cationic surfactants include primary, secondary, and tertiary amine salt type compounds, an alkyl amine salt, a dialkyl amine salt, an aliphatic amine salt, a benzalkonium salt, a quaternary ammonium salt, a quaternary alkyl ammonium salt, an alkyl pyridinium salt, a sulfonium salt, a phosphonium salt, an onium salt, and an imidazolinium salt. Specific examples thereof include hydrochlorides, acetates, and the like of lauryl amine, coconut amine, rosin amine, and the like, lauryl trimethyl ammonium chloride, cetyl trimethyl ammonium chloride, benzyl tributyl ammonium chloride, benzalkonium chloride, dimethylethyl lauryl ammonium ethyl sulfate, dimethylethyl octyl ammoniumethyl sulfate, trimethyl lauryl ammonium hydrochloride, cetyl pyridinium chloride, cetyl pyridinium bromide, dihydroxyethyl laurylamine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The content of the coagulant is preferably 0.50% by mass to 10.0% by mass, more preferably 1.0% by mass to 7.5% by mass, and still more preferably 1.5% by mass to 5.0% by mass based on the total amount of the reaction liquid. Due to the fact that the content of the coagulant is 0.50% by mass or more, unevenness in solid printing and bleed are further suppressed, so that the quality of recorded matter to be obtained tends to be further improved. Due to the fact that the content of the coagulant is 10.0% by mass or less, the deposition of the coagulant which is insoluble is prevented, so that the storage stability tends to be further improved.

Water

As water, those in which ionic impurities are removed as much as possible, such as pure water or ultrapure water, e.g., ion exchange water, ultrafiltration water, reverse osmosis water, or distilled water, are mentioned. When water sterilized by irradiation with ultraviolet rays or adding hydrogen peroxide, it is possible to prevent the generation of fungi or bacteria in the case where the reaction liquid is stored for a long period of time. Thus, the storage stability tends to be further improved.

The content of water is preferably 55 to 85% by mass, more preferably 60 to 80% by mass, and still more preferably 65 to 75% by mass based on the total amount of the reaction liquid.

Organic Solvent

The organic solvents are not particularly limited and examples of the organic solvents include, for example, permeation solvents of alkyl diols, such as 1,2-pentanediol and 1,2-hexanediol, 1,3-propanediol, 1,4-butanediol, 1,5-pentanediol, 1,6-hexanediol, 1,7-heptanediol, and 1,8-octanediol; permeation solvents of glycol ethers, such as ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether; moisturizers, such as ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycols having a number average molecular weight of 2000 or less, 1,3-propylene glycol, isopropylene glycol, isobutylene glycol, glycerol, mesoerythritol, and pentaerythritol.

The content of the organic solvent is preferably 10 to 40% by mass, more preferably 15 to 35% by mass, and still more preferably 20 to 30% by mass based on the total amount of the reaction liquid.

Recording Medium

The ink jet recording method of this embodiment is used for a low absorbent recording medium or a non-absorbent recording medium. These low absorbent recording media having low ink absorbability have poor absorbability of the reaction liquid. Therefore, when a coagulant which generally tends to have deliquescence is used, the wet abrasion resistance of recorded matter to be obtained tends to decrease. Therefore, the invention is particularly useful.

The low absorbent recording medium is not particularly limited and, for example, a coated paper having a coating layer for receiving oily ink provided on a surface is mentioned, for example. The coated paper is not particularly limited and, for example, printing paper, such as art paper, coated paper, and mat paper, is mentioned.

The non-absorbent recording medium is not particularly limited and examples of the non-absorbent recording medium include, for example, films and plates of plastics, such as polyvinyl chloride, polyethylene, polypropylene, polyethylene terephthalate (PET), polycarbonate, polystyrene, and polyurethane; plates of metals, such as iron, silver, copper, and aluminum; metal plates manufactured by vapor deposition of the various metals, plastic films, and plates of alloys, such as stainless steel and brass; recording media in which films of plastics, such as polyvinyl chloride, polyethylene, polypropylene, polyethylene terephthalate (PET), polycarbonate, polystyrene, and polyurethane, are bonded (coating) to base materials made of paper, and the like.

Among the above, the low absorbent recording medium or the non-absorbent recording medium is preferably a film. By the use of such a recording medium, the wet abrasion resistance of recorded matter to be obtained tends to decrease. Therefore, the invention is particularly useful.

The non-absorbent recording medium or the low absorbent recording medium can be classified according to the wettability to water of a recording surface. The recording medium can be characterized by adding dropwise 0.5 µL of water droplets to a recording surface of a recording medium, and then measuring the contact angle decrease rate (comparison between the contact angle in 0.5 milliseconds after landing and the contact angle in 5 seconds after landing). More specifically, as the characteristic of the recording medium, the "non-absorbent" of the "non-absorbent recording medium" refers to the fact that the decrease rate is less than 1% and the "low absorbent" of the "low absorbent recording medium" refers to the fact that the decrease rate is 1% or more and less than 5%. The contact angle can be measured using a portable contact angle meter PCA-1 (manufactured by Kyowa Interface Science Co., LTD.) or the like.

Ink Composition Attaching Process

The ink composition attaching process is a process of attaching an ink composition containing water and a resin having a percentage of water absorption of 0.3% or less to at least one part of the first recorded region to form a second recorded region.

A method for attaching the ink composition is not particularly limited and, for example, an ink jet system can be used. The ink composition attaching process may further include a process of drying at least one part of the ink composition applied to the recording medium.

The maximum application amount of the resin having a percentage of water absorption of 0.3% or less in the second recorded region is preferably 0.010 to 1.0 mg/inch$^2$, more preferably 0.025 to 0.50 mg/inch$^2$, and still more preferably 0.050 to 0.45 mg/inch$^2$. The "maximum application amount" is the maximum application amount among application amounts of recorded regions when the application amount varies depending on the recorded regions in a recording method. When two or more kinds of ink compositions are used and when a plurality of ink compositions contain resins having a percentage of water absorption of 0.3% or less as described later, the maximum application amount is the total amount of the resins.

In the ink composition attaching process, one kind of ink composition may be used or two or more kinds of ink compositions may be used. When two or more kinds of ink compositions are used, one ink composition is attached to at least one part of a first recorded region to form a second second recorded region, and then another ink composition is attached to at least one part of the second second recorded region to be able to form a second recorded region. When two or more kinds of ink compositions are used, at least one kind of ink composition may contain water and a resin having a percentage of water absorption of 0.3% or less. When two or more kinds of ink compositions are used, it is preferable for at least the ink composition to be attached later to contain water and a resin having a percentage of water absorption of 0.3% or less. Thus, the degree of freedom in design of the other ink compositions is further improved, so that cost reduction can be achieved, and moreover the wet abrasion resistance of recorded matter to be obtained tends to be further improved.

In the aspect of using two or more kinds of ink compositions, the ink composition attaching process may include a process of attaching a first ink composition which contains water and a resin having a percentage of water absorption of 0.3% or less and in which the content of the resin having a percentage of water absorption of 0.3% or less is less than 0.50% by mass to at least one part of a first recorded region to forms a second second recorded region, and a process of attaching a second ink composition which contains water and a resin having a percentage of water absorption of 0.3% or less and in which the content of the resin having a percentage of water absorption of 0.3% or less is 0.50% by mass or more to at least one part of the second recorded region to form a second recorded region. By having such a process, the degree of freedom in design of the first ink composition is further improved, cost reduction can be achieved, and the wet abrasion resistance of recorded matter to be obtained tends to be further improved by the second ink composition. In this case, the first ink composition may not contain a resin having a percentage of water absorption of 0.3% or less (Content of 0% by mass).

The ink composition may be one at least having water and a percentage of water absorption of 0.3% or less and, in addition thereto, may be one containing a resin having a percentage of water absorption of more than 0.3%. When two or more kinds of ink compositions are used, at least one kind of ink composition may be one containing water and a resin having a percentage of water absorption of 0.3% or less and an ink composition not containing a resin having a percentage of water absorption of 0.3% or less and water may be contained. In particular, an ink composition containing water and a resin having a percentage of water absorption of more than 0.3% may be contained. In this case, it is preferable to contain the resin in the respect that the degree of freedom in design of the ink composition increases. Preferable contents of the resin having a percentage of water absorption of more than 0.3% in the ink composition containing the resin having a percentage of water absorption of more than 0.3% can be set to the same contents as the preferable contents of the resin having a percentage of water absorption of 0.3% or less.

Ink Composition

The ink composition contains water and a resin having a percentage of water absorption of 0.3% or less and can contain other components, such as a useful agent and water, as necessary.

The ink composition may be a color ink composition containing a resin having a percentage of water absorption of 0.3% or less, water, and a coloring material, may be a clear ink composition containing resin and water, or may contain the color ink composition and the clear ink composition in combination. By the use of the color ink composition, a colored image can be recorded. By the use of the clear ink composition, the wet abrasion resistance tends to be further improved. By the use of the color ink composition and the clear ink composition in combination, the wet abrasion resistance of a colored image tends to be further improved.

In the case of using the first ink composition and the second ink composition, the first ink composition may be either the color ink composition or the clear ink composition. The second ink composition may also be either the color ink composition or the clear ink composition. It is preferable that the first ink composition is the color ink composition and the second ink composition is the clear ink composition.

The "clear ink" is not an ink to be used in order to color a recording medium but an ink to be used for the other purposes. The other purposes are purposes for adjusting the glossiness of a recording medium, improving the properties, such as abrasion resistance, of recorded matter, increasing fixability and color development properties of a color ink, and the like. The clear ink is an ink composition having a content of a coloring material of 0.1% by mass or less and preferably not containing a coloring material. On the other hand, the "color ink" is an ink composition having a content of a coloring material of more than 0.1% by mass.

Resin Having Percentage of Water Absorption of 0.3% or Less

The percentage of water absorption of the resin is 0.3% or less, preferably 0.2% or less, more preferably 0.15% or less, still more preferably 0.1% or less, particularly preferably 0.05% or less, yet still more preferably 0.03% or less, and even more preferably 0.01% or less. Due to the fact that the percentage of water absorption is equal to or less than the percentages of water absorption mentioned above, the wet abrasion resistance tends to be further improved. The lower limit of the percentage of water absorption is not particularly limited and is preferably 0% or more and more preferably 0.001% or more. The percentage of water absorption can be measured by a method described in Examples.

The content of the resin having a percentage of water absorption of 0.3% or less is preferably 0.50 to 15% by mass, more preferably 1.0 to 12.5% by mass, and still more preferably 2.0 to 10% by mass based on the total amount of the ink composition. Due to the fact that the content of the resin having a percentage of water absorption of 0.3% or less is 0.50% by mass or more, the wet abrasion resistance of an image to be obtained tends to be further improved. Due to the fact that the content of the resin having a percentage of water absorption of 0.3% or less is 15% by mass or less, nozzle clogging recovery and storage stability tend to be further improved.

In the case of using the first ink composition, the content of the resin having a percentage of water absorption of 0.3% or less is preferably less than 0.50% by mass and more preferably 0% by mass or more and less than 0.50% by mass based on the total amount of the first ink composition.

In the case of using the second ink composition, the content of the resin having a percentage of water absorption of 0.3% or less is preferably 0.50% by mass or more, more preferably 0.50 to 15% by mass, still more preferably 1.0 to 12.5% by mass, and yet still more preferably 2.0 to 10% by mass based on the total amount of the second ink composition. Due to the fact that the content of the resin having a percentage of water absorption of 0.3% or less is 0.50% by mass or more based on the total amount of the second ink composition, the wet abrasion resistance of an image to be obtained tends to be further improved.

In the case of using the color ink composition, the content of the resin having a percentage of water absorption of 0.3% or less is preferably 0.50 to 6.0% by mass, more preferably 1.0% by mass or more to 5.0% by mass or less, and still more preferably 2.0 to 4.0% by mass based on the total amount of the color ink composition. Due to the fact that the content of the resin having a percentage of water absorption of 0.3% or less in the color ink composition is 0.50% by mass or more, the wet abrasion resistance of an image to be obtained tends to be further improved. Due to the fact that the content of the resin having a percentage of water absorption of 0.3% or less in the color ink composition is 10% by mass or less, nozzle clogging recovery and storage stability tend to be further improved.

In the case of using the clear ink composition, the content of the resin having a percentage of water absorption of 0.3% or less is preferably 5.0 to 12% by mass, more preferably 6.0% by mass or more to 10% by mass or less, and still more preferably 7.0 to 9.0% by mass based on the total amount of the clear ink composition. Due to the fact that the content of the resin having a percentage of water absorption of 0.3% or less in the clear ink composition is 5.0% by mass or more, the wet abrasion resistance of an image to be obtained tends to be further improved. Due to the fact that the content of the resin having a percentage of water absorption of 0.3% or less in the clear ink composition is 12% by mass or less, nozzle clogging recovery and storage stability tend to be further improved.

The resin having a percentage of water absorption of 0.3% or less is not particularly limited and, for example, polyolefin-based resin, such as polyethylene, polypropylene, and modified polyolefin; fluororesin; ethylene vinyl acetate resin; ethylene acrylic resin, and the like are preferable. Among the above, polyolefin-based resin is more preferable. The resins may be used alone or in combination of two or more kinds thereof.

Commercially-available items of such resin are not particularly limited and examples of the commercially-available items thereof include AQUACER 507, 526, and 593 (Trade name, manufactured by BYK); Polysol EVA P-550N, FP3000, and FP-3000A (Trade name, manufactured by Showa Denko K.K.); Hightech S-3148K (Trade name, manufactured by TOHO Chemical Industry Co., Ltd. make); Mowinyl 972, 8020, and 8055A (Trade name, manufactured by The Nippon Synthetic Chemical Industry Co., Ltd.); Chemipearl 5650, S75N, SEW113, and S80N (Trade name, manufactured by Mitsui Chemicals, Inc.); Arrow base SD (a Trade name, manufactured by UNITIKA LTD.); and Zaikthene A and L (Trade name, manufactured by Sumitomo Seika Chemicals Co., Ltd.).

The form of the resin is not particularly limited and a water-soluble resin or resin fine particles (water insoluble resin) may be acceptable. Among the above, it is preferable to contain resin fine particles. Due to the fact that resin fine particles are contained, the wet abrasion resistance tends to be further improved.

The resin may have a fluorene skeleton. Hereinafter, the resin having a fluorene skeleton is described.

A fluorene-based resin can be obtained by a reaction between a polyol component containing a first diol containing a fluorene skeleton and a second diol having a hydrophilic group and a polyisocyanate component containing a polyisocyanate compound.

The first diol containing a fluorene skeleton is not particularly limited and examples of the first diol include 9,9-bis(4-(hydroxymethoxy)phenyl)fluorene, 9,9-bis(4-(2-hydroxyethoxy)phenyl)fluorene, 9,9-bis(4-(3-hydroxypropoxy)phenyl)fluorene, 9,9-bis(4-(4-hydroxybutoxy)phenyl)fluorene, 9,9-bis(4-hydroxyphenyl)fluorene, 9,9-bis(4-hydroxytolyl)fluorene, 9,9-bis(hydroxyalkyl)fluorene, and the like. Among the above, 9,9-bis(4-(2-hydroxyethoxy)phenyl)fluorene is preferable. As the first diol, commercially-available items may be used and, for example, bisphenoxy ethanol fluorene, bisphenol fluorene, biscresol fluorene (Trade name; all manufactured by Osaka Gas Chemical Co., Ltd.), and the like are mentioned. These first diols containing a fluorene skeleton may be used alone or in combination of two or more kinds thereof.

The content of the first diol is preferably 40 to 60% by mass based on the total amount of the fluorene-based resin. Due to the fact that the content of the first diol containing a fluorene skeleton is in the range mentioned above, the fixability and the transparency are excellent.

The hydrophilic group contained in the second diol is not particularly limited and examples of the hydrophilic group include, for example, nonionic groups, such as a polyoxy ethylene group, and ionic groups, such as a carboxyl group, a sulfonyl group, a phosphoric acid group, a sulfobetaine group, and the like.

The second diol is not particularly limited and examples of the second diol include, for example, diols having carboxyl groups, such as dihydroxy carboxylic acids, such as 2,2-dimethylol acetic acid, 2,2-dimethylol lactic acid, 2,2-dimethylol propionic acid (2,2-bis(hydroxymethyl)propionic acid), 2,2-dimethylol butanoic acid, 2,2-dimethylol butyric acid, and 2,2-dimethylol valeric acid, and diamino carboxylic acids, such as lysine and arginine; diols having sulfonyl groups, such as N,N-bis(2-hydroxyethyl)-2-amino ethane sulfonic acid, 1,3-phenylenediamine-4,6-disulfonic acid, diamino butane sulfonic acid, 3,6-diamino-2-toluenesulfonic acid, and 2,4-diamino-5-toluenesulfonic acid; diols having phosphoric acid groups, such as 2,3-dihydroxy propyl phenyl phosphate; diols having betaine structure containing groups, such as sulfobetaine group containing compounds obtained by a reaction between tertiary amines, such as N-methyl diethanolamine and 1,3-propanesultone; and alkylene oxide modified substances in which alkylene oxides, such as ethylene oxide and propylene oxide, are added. Among the above, the second diols having a carboxyl group, e.g., 2,2-dimethylol propionic acid, are preferable. The second diols may be used alone or in combination of two or more kinds thereof.

The content of the second diol is preferably 5 to 15% by mass based on the total amount of the fluorene-based resin. Due to the fact that the content of the second diol is in the range mentioned above, the fixability and the transparency are excellent.

The fluorene-based resin may also contain a constituent unit containing a polyol compound as necessary. The polyol compound is a compound having two or more hydroxy groups, and low molecular weight polyols and high molecular weight polyols are mentioned.

The polyisocyanate compound is not particularly limited. For example, examples of the polyisocyanate compound include aliphatic polyisocyanates, such as hexamethylene diisocyanate and tetramethylene diisocyanate; alicyclic polyisocyanates, such as isophorone diisocyanate (3-isocyanatemethyl-3,5,5-trimethylcyclohexyl isocyanate) and 4,4'-, 2,4'-, or 2,2'-dicyclohexylmethane diisocyanate or a mixture thereof; aromatic aliphatic polyisocyanates, such as 1,3- or 1,4-xylylene diisocyanate or a mixture thereof and 1,3- or 1,4-bis(1-isocyanate-1-methylethyl)benzene or a mixture thereof; aromatic polyisocyanates, such as 4'4-, 2,4'-, or 2,2'-diphenyl methane diisocyanate or a mixture thereof, 2,4- or 2,6-tolylene diisocyanate or a mixture thereof, 4,4'-toluidine diisocyanate, and 1,5-naphthalene diisocyanate; polymers of the various polyisocyanate compounds mentioned above, (for example, a dimer, a trimer, and the like), biuret modified substances generated by a reaction between, for example, the various polyisocyanate compounds mentioned above or polymers thereof and water, allophanate modified substances generated by a reaction between various polyisocyanate compounds mentioned above or polymers thereof and alcohols or low molecular weight polyols, oxadiazinetrion modified substances generated by a reaction between various polyisocyanate compounds mentioned above or polymers thereof and carbon dioxide, polyol modified substances generated by a reaction between various polyisocyanate compounds mentioned above or polymers thereof and low molecular weight polyols mentioned above, and the like. Among the above, alicyclic polyisocyanates are mentioned and, for example, isophorone diisocyanate is preferable. These polyisocyanate compounds may be used alone or in combination of two or more kinds thereof.

In order to carry out a urethanization reaction of the polyol component (i.e., the first diol containing a fluorene skeleton, the second diol having a hydrophilic group, and, as necessary, a polyol compound) and the polyisocyanate component (i.e., a polyisocyanate compound), known methods can be used. The equivalent ratio (NCO/Hydroxy group) of the isocyanate group of the polyisocyanate component to the hydroxy group of the polyol component is preferably 0.4 to 1.0 and more preferably 0.8 to 0.95.

The reaction can be performed under normal pressure and, as necessary, under a nitrogen atmosphere. The reaction temperature is preferably 40 to 100° C. and the reaction time is preferably 5 to 24 hours. In this reaction, a reaction solvent and a reaction catalyst can be used as necessary.

As the reaction solvent, a low boiling point solvent which is inert to an isocyanate group is preferable. Such a solvent is not particularly limited and examples of the solvent include, for example alcohols, such as ethanol and isopropanol; ketones, such as acetone and methyl ethyl ketone; ethers, such as tetrahydrofuran; cellosolves, such as methyl cellosolve and ethyl cellosolve; carbitols, such as methyl carbitol and ethyl carbitol; nitriles, such as acetonitrile. The use amount of the reaction solvent can be determined as appropriate.

The reaction catalyst is not particularly limited, and known urethanization catalysts, such as amine-based catalysts, tin-based catalysts, and lead-based catalysts, are mentioned, for example. The addition amount of the reaction solvent can be determined as appropriate.

The acid value of the fluorene-based resin is preferably 10 to 130 KOHmg/g and more preferably 20 to 60 KOHmg/g. Due to the fact that the acid value of the fluorene-based resin is in the ranges mentioned above, the dispersion stability of pigments is excellent.

The number average molecular weight of the fluorene-based resin is preferably 2000 to 40000 and more preferably 2000 to 10000 in terms of standard polystyrene by GPC measurement. The weight average molecular weight is preferably 3000 to 50000.

The fluorene-based resin can be preferably prepared as a water dispersion liquid. For example, when the hydrophilic group of the second diol is an anionic group, the obtained fluorene-based resin can be dispersed in water after neutralizing the anionic group.

For the neutralization of the anionic group, for example, a neutralizer selected from organic amines, such as trimethylamine, triethylamine, tri-n-propylamine, tributylamine, triethanolamine, amino methyl propanol, amino methyl propanediol, aminoethyl propanediol, trihydroxy methyl amino methane, monoethanolamine, and triisopropanolamine; inorganic alkali salts, such as potassium hydroxide and sodium hydroxide; ammonia; and the like is added to the fluorene-based resin to form a salt of the anionic group.

The addition amount of the neutralizer can be set to, for example, 0.3 to 1.0 eq. per eq. of the anionic group.

Subsequently, in order to disperse the fluorene-based resin in water, water is gradually added to the fluorene-based resin while stirring the fluorene-based resin or the fluorene-based resin is gradually added to water while stirring the water, for example. Thus, the water dispersion liquid of the fluorene-based resin is prepared. In the stirring, it is preferable to perform mixing using a homomixer or the like in such a manner that high shearing is given.

The addition amount of water is determined as appropriate based on a desired solid content mass of the water dispersion liquid of the fluorene-based resin and is preferably 100 to 900% by mass and more preferably 200 to 400% by mass based on 100% by mass of the fluorene-based resin, for example.

Thus, the water dispersion liquid of the fluorene-based resin in which the fluorene-based resin is dispersed in water is prepared. The pH of the water dispersion liquid of the fluorene-based resin is usually about 7 to 9.

The solid content of the water dispersion liquid of the fluorene-based resin is preferably 10 to 50% by mass and more preferably 25 to 35% by mass.

When the reaction solvent is used in the urethanization reaction, the reaction solvent is distilled off by heating the reaction solvent at an appropriate temperature under reduced pressure, for example, after the termination of the urethanization reaction or after the dispersion in water.

Coloring Material

Hereinafter, coloring materials which may be contained when the color ink composition is used as the ink composition are shown below.

Pigments for use in black ink are not particularly limited. Examples of the pigments include, for example, No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW1, Color Black FW2, Color Black FW2V, Color Black FW18, Color Black FW200, Color Black 5150, Col or Black 5160, Color Black 5170, Printex 35, Printex U, Printex V, Printex 140U, Special Black 6, Special Black 5, Special Black 4A, and Special Black 4 (all manufactured by Degussa).

Pigments for use in white ink are not particularly limited. Examples of the pigments include, for example, white inorganic pigments, such as C.I. Pigment White 6, 18, and 21, titanium oxide, zinc oxide, zinc sulfide, antimony oxide, and zirconium oxide. In addition to the white inorganic pigments, white organic pigments, such as white hollow resin particles and polymer particles, can also be used.

Pigments for use in yellow ink are not particularly limited. Examples of the pigments include, for example, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Pigments for use in magenta ink are not particularly limited. Examples of the pigments include, for example, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48 (Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50.

Pigments for use in cyan ink are not particularly limited. Examples of the pigments include, for example, C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Pigments for use in color ink other than magenta, cyan, and yellow ink are not particularly limited. Examples of the pigments include, for example, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The content of the pigment is preferably 1.0 to 10% by mass, more preferably 2.5 to 7.5% by mass, and still more preferably 3.0 to 6.0% by mass based on the total amount of the ink composition.

Water

As water, those in which ionic impurities are removed as much as possible, such as pure water or ultrapure water, e.g., ion exchange water, ultrafiltration water, reverse osmosis water, or distilled water, are mentioned. When water sterilized by irradiation with ultraviolet rays or adding hydrogen peroxide, it is possible to prevent the generation of fungi or bacteria in the case where ink is stored for a long period of time. Thus, the storage stability tends to be further improved.

The content of water is preferably 55 to 85% by mass, more preferably 60 to 80% by mass, and still more preferably 65 to 75% by mass based on the total amount of the ink composition.

Organic Solvent

As the organic solvent, those mentioned as examples in the description of the reaction liquid can be used. Organic solvents usable in the ink composition may be the same as or may be different from those usable in the reaction liquid.

The content of the organic solvent is preferably 10 to 40% by mass, more preferably 15 to 35% by mass, and still more preferably 20 to 30% by mass based on the total amount of the ink composition.

Ink Set

An ink set of this embodiment at least contains an ink composition containing a resin having a percentage of water absorption 0.3% or less and water and a reaction liquid containing at least either organic acid or a polyvalent metallic salt having solubility of 120 g or less in 100 g of water as a coagulant which coagulates the components of the ink composition, and the ink set is used for performing recording on a low absorbent recording medium or a non-absorbent recording medium.

As the ink composition, the same substances mentioned above may be used and may be used alone or in combination of two or more kinds thereof. In the case of using two or more kinds in combination, ink compositions equivalent to the first ink composition and the second ink composition can be used in combination.

Moreover, the same substances mentioned above can be used also in the reaction liquid.

EXAMPLES

Hereinafter, the invention is more specifically described with reference to Examples and Comparative Examples. The invention is not particularly limited at all to Examples described below.

Materials for Ink Composition

Main materials for ink compositions used in Examples and Comparative Examples described below are as follows.
Reaction liquid
Coagulant
Magnesium sulfate (Solubility: 34 g)
Calcium nitrate (Solubility: 121 g)
Succinic acid (Solubility: 5 g)
Permeation solvent
1,2-hexanediol
Moisturizer
Propylene glycol
Ink composition
Coloring material
Pigment Blue 15:3 (P.B 15:3)
Resin
Arrow Base SD (Percentage of water absorption: 0.01%, manufactured by UNITIKA LTD., polyolefin-based resin)
Resin A (Percentage of water absorption: 0.4%, Styrene acrylic resin emulsion, manufactured by Mitsui Chemicals, Inc.)
BYK AQUACER 593 (Percentage of water absorption: 0.05%, Modified polypropylene wax, manufactured by BYK Chemie Japan)
Organic solvent
1,2-hexanediol
Propylene glycol
Preparation of Ink Composition The materials were mixed according to the compositions shown in the following table 1, and then sufficiently stirred to prepare ink compositions. In the following table 1, the unit of the numerical values is % by mass and the total is 100.0% by mass.

Method for Measuring Percentage of Water Absorption of Resin

With respect to the percentage of water absorption of resin, liquid containing the resin was added dropwise to a glass plate, dried, and then heated for 10 minutes at a temperature of +10° C. of the glass transition point temperature of the resin after drying to form a dry resin layer. However, when the glass transition point temperature of the resin was less than 40° C. in this process, the liquid was heated at 50° C. for 10 minutes. Next, the mass of the resin of the resin layer was measured. Then, the glass plate on which the resin layer was formed was placed in a high temperature and high humidity chamber, and then allowed to stand under an atmosphere of a humidity of 100% RH and a temperature of 50° C. for 3 days. Next, the glass plate was taken out from the high temperature and high humidity chamber, the mass of the resin layer is measured in a state where water droplets did not adhere to the surface of the glass plate or the resin layer, and then the percentage of water absorption was calculated from a mass (M2) of the resin layer after taken out from the high temperature and high humidity chamber based on a mass (M1) of the resin layer before placed in the high temperature and high humidity chamber.

Percentage of water absorption=$(M2-M1)/M1 \times 100$ (%)

TABLE 1

| Reaction liquid composition | | Reaction liquid 1 | Reaction liquid 2 | Reaction liquid 3 |
|---|---|---|---|---|
| Coagulant | Magnesium sulfate (Solubility: 34 g) | 2 | | |
| | Calcium nitrate (Solubility: 121 g) | | 2 | |
| | Succinic acid (Solubility: 5 g) | | | 2 |
| Organic solvent | 1,2-hexanediol | 5 | 5 | 5 |
| | Propylene glycol | 20 | 20 | 20 |
| Balance | Water | Balance | Balance | Balance |
| | Total | 100 | 100 | 100 |

TABLE 2

| Ink composition | | Color 1 | Color 2 | Clear 1 | Clear 2 | Color 3 |
|---|---|---|---|---|---|---|
| Coloring material | P.B. 15:3 | 5 | 5 | | | 5 |
| Resin | Arrow Base SD (Percentage of water absorption: 0.01%) | 3 | | 8 | | |
| | Resin A (Percentage of water absorption: 0.4%) | | 3 | | 8 | |
| | BYK AQUACER 593 (Percentage of water absorption: 0.05%) | | | | | 3 |
| Organic solvent | 1,2-hexanediol | 5 | 5 | 5 | 5 | 5 |
| | Propylene glycol | 20 | 20 | 20 | 20 | 20 |
| Balance | Water | Balance | Balance | Balance | Balance | Balance |
| | Total | 100 | 100 | 100 | 100 | 100 |

TABLE 3

| | | Examples | | | | | | | | | | Comparative Examples | | | | | |
|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 |
| Reaction liquid attaching process | Reaction liquid | 1 | 1 | 1 | 1 | 1 | 1 | 1 | 1 | 3 | 1 | 2 | 1 | 2 | 1 | 2 | 1 |
| | Application amount (mg/inch$^2$) | 0.4 | 0.4 | 0.4 | 0.4 | 0.4 | 0.4 | 0.1 | 10 | 0.4 | 0.4 | 0.4 | 0.4 | 0.4 | 0.4 | 0.4 | 0.4 |
| | Coagulant application amount (mg/inch$^2$) | 0.008 | 0.008 | 0.008 | 0.008 | 0.008 | 0.008 | 0.002 | 0.2 | 0.008 | 0.008 | 0.008 | 0.008 | 0.008 | 0.008 | 0.008 | 0.008 |
| Ink composition attaching process (1) | Ink type | Color 1 | Color 1 | Color 1 | Color 1 | Color 2 | Color 1 | Color 1 | Color 1 | Color 1 | Color 3 | Color 1 | Color 2 | Color 1 | Color 2 | Color 1 | Color 2 |
| | Application amount (mg/inch$^2$) | 1.4 | 20 | 3 | 0.7 | 0.7 | 1.5 | 3 | 1.5 | 1.4 | 3 | 1.4 | 1.4 | 3 | 3 | 1.4 | 0.7 |
| | Resin application amount (mg/inch$^2$) | 0.042 | 0.6 | 0.09 | 0.021 | 0.021 | 0.045 | 0.09 | 0.045 | 0.042 | 0.09 | 0.042 | 0.042 | 0.09 | 0.09 | 0.042 | 0.021 |
| Ink composition attaching process (2) | Ink type | | | | Clear 1 | Clear 1 | Clear 1 | | Clear 1 | | | | | | | Clear 1 | Clear 2 |
| | Application amount (mg/inch$^2$) | 0 | 0 | 0 | 0.7 | 1.4 | 1.5 | 0 | 1.5 | 0 | 0 | 0 | 0 | 0 | 0 | 1.4 | 1.4 |
| | Resin application amount (mg/inch$^2$) | 0 | 0 | 0 | 0.021 | 0.042 | 0.045 | 0 | 0.045 | 0 | 0 | 0 | 0 | 0 | 0 | 0.042 | 0.042 |
| Total application amount of resin (mg/inch$^2$) | | 0.042 | 0.6 | 0.09 | 0.042 | 0.042 | 0.09 | 0.09 | 0.09 | 0.042 | 0.09 | 0.042 | 0 | 0.09 | 0 | 0.084 | 0 |
| Wet abrasion resistance | | Δ | Δ | ○ | ○ | ○ | ⊙ | ○ | ○ | Δ | Δ | X | X | X | X | X | X |
| Image quality | | ○ | ○ | ○ | ○ | ○ | ○ | Δ | ○ | Δ | ○ | ○ | ○ | ○ | ○ | ○ | ○ |

*Resin application amount: Application amount of resin contained in ink

Recording Method

An ink jet printer PX-G930 (Trade name, manufactured by Seiko Epson Corp., Nozzle resolution: 180 dpi) was converted by attaching a platen heater, and then each ink composition and each reaction liquid obtained as described above were filled into an ink cartridge of the converted ink jet printer. Then, each reaction liquid was attached in a state where the surface temperature of a recording surface of a film (Trade name "SY51M", Polypropylene film manufactured by UPM RAFLATA, A4 size) was heated to 40° C. to form a first recorded region (Reaction liquid attaching process). In the reaction liquid attaching process, the application amount per pixel of each reaction liquid in Table 1 was adjusted in such a manner as to have the application amount shown in Table 3. The recording resolution of the reaction liquid was set to 720×720 dpi.

After the application of the reaction liquid, a recording medium was reversely fed, and then fed again. Then, liquid droplets of each ink composition were attached onto the first recorded region to form a second recorded region (or a second second recorded region) (Ink composition attaching process (1)). In this case, the ink amount per pixel was adjusted to be set to the application amount shown in Table 3. The image resolution of the ink composition was set to 720×720 dpi.

In Examples 4 to 6 and 8 and Comparative Examples 5 to 6, a recording medium was further reversely fed, and then fed again. Then, the ink composition was attached onto the second second recorded region (Ink composition attaching process (2)). In this case, the ink amount per pixel was adjusted to be set to the application amount shown in Table 3. The image resolution of the ink composition was set to 720×720 dpi.

Thereafter, each recording medium discharged from the recording apparatus was dried by heating at 70° C. for 5 minutes to produce recorded matter. Each reaction liquid and each ink were recorded on the entire recording region except a 1 cm margin in a periphery of each recording medium.

Image Quality (Evenness in Solid Printing)

The printing unevenness of the obtained recorded matter was visually checked to evaluate the image quality based on the following evaluation criteria.

(Evaluation criteria)

○: No printing unevenness was observed.

Δ: Printing unevenness was observed.

Wet Abrasion Resistance

The obtained recorded matter was allowed to stand in a laboratory in an environment of room temperature (25° C.) for 5 hours, and then the recorded surface was rubbed with a cotton cloth soaked in water 30 times under a 200 g load using a Gakushin-type rubbing fastness tester (Product name "AB-301", TESTER SANGYO CO., LTD.). Then, the peeling state of the recorded surface and the ink transfer state to the cotton cloth were visually checked to evaluate the wet abrasion resistance based on the following evaluation criteria.

(Evaluation criteria)

⊙: Even when rubbed 30 times, ink peeling and ink transfer to the cotton cloth were not observed.

○: When rubbed less than 30 times and 10 times or more, ink peeling or ink transfer to the cotton cloth was observed.

Δ: When rubbed less than 10 times and 5 times or more, ink peeling or ink transfer to the cotton cloth was observed.

X: When rubbed less than 5 times, ink peeling or ink transfer to the cotton cloth was observed.

It was found that the deliquescence action of the coagulant was excessively strong in Comparative Examples 1, 3, and 5 using the reaction liquid containing a coagulant having solubility of more than 120 g in 100 g of water, the wet abrasion resistance was poor. It was also found that the wet abrasion resistance was poor also in Comparative Examples 2, 4, and 6 using the ink composition having a percentage of water absorption of more than 0.3%.

The entire disclosure of Japanese Patent Application No. 2015-086997, filed Apr. 21, 2015 is expressly incorporated by reference herein.

What is claimed is:

1. An ink jet recording method comprising:
   attaching by ink jet coating a reactin liquid to a low absorbent recording medium or non-absorbent recording medium to form a first recorded region, the reaction liquid containing a coagulant having solubility of 120 g or less in 100 g of water as a coagulant which coagulates components of an ink composition, and
   attaching the ink composition containing water and a resin having a percentage of water absorption of 0.3% or less to at least one part of the first recorded region to form a second recorded region,
   wherein the attaching of the ink composition includes:
      attaching a first ink composition to at least one part of the first recorded region to form the second recorded region, the first ink composition being a color ink composition that contains water, a coloring material, and the resin having a percentage of water absorption of 0.3% or less, a content of the resin having a percentage of water absorption of 0.3% or less being less than 5% by mass, and
      attaching a second ink composition such that the second ink composition overlaps the first ink composition,
      wherein the second ink composition is a clear ink composition that contains water and the resin having a percentage of water absorption of 0.3% or less, a content of the resin having a percentage of water absorption of 0.3% or less in the second ink composition is 10% by mass or less, and
   the resins having a percentage of water absorption of 0.3% or less contained in each of the first and second ink compositions are a polyolefin-based resin.

2. The ink jet recording method according to claim 1, wherein
   the resin contains resin fine particles.

3. The ink jet recording method according to claim 1, wherein
   a maximum application amount of the resin in the second recorded region is 0.050 to 0.45 mg/inch$^2$.

4. The ink jet recording method according to claim 1, wherein
   a maximum application amount of the coagulant in the first recorded region is 0.0030 to 0.15 mg/inch$^2$.

5. The ink jet recording method according to claim 1, wherein
   the low absorbent recording medium or the non-absorbent recording medium is a film.

6. The ink jet recording method according to claim 1, wherein
   the reaction liquid contains at least either a polyvalent metallic salt or organic acid as the coagulant.

7. The ink jet recording method of claim 1, wherein the resin having the percentage of water absorption of 0.3% or less is one of a polyethylene resin and a polypropylene resin.

8. The inkjet recording method of claim 1, wherein the recording medium is a non-absorbent recording medium.

9. The ink jet recording method of claim 1, wherein the content of the resin having a percentage of water absorption of 0.3% or less is 3% by mass or less with respect to the total mass of the first ink composition.

10. The inkjet recording method of claim 1, wherein the content of the resin having a percentage of water absorption of 0.3% or less is 0.5% to 10% by mass with respect to the total mass of the second ink composition.

11. The inkjet recording method of claim 1, wherein a maximum amount of the resin having a percentage of water absorption of 0.3% or less in the second recorded region is 0.05 mg/inch$^2$.

* * * * *